Oct. 27, 1936.  P. M. HAFFCKE  2,058,686
WAVE SIGNALING METHOD AND APPARATUS
Original Filed Oct. 25, 1932   3 Sheets-Sheet 1
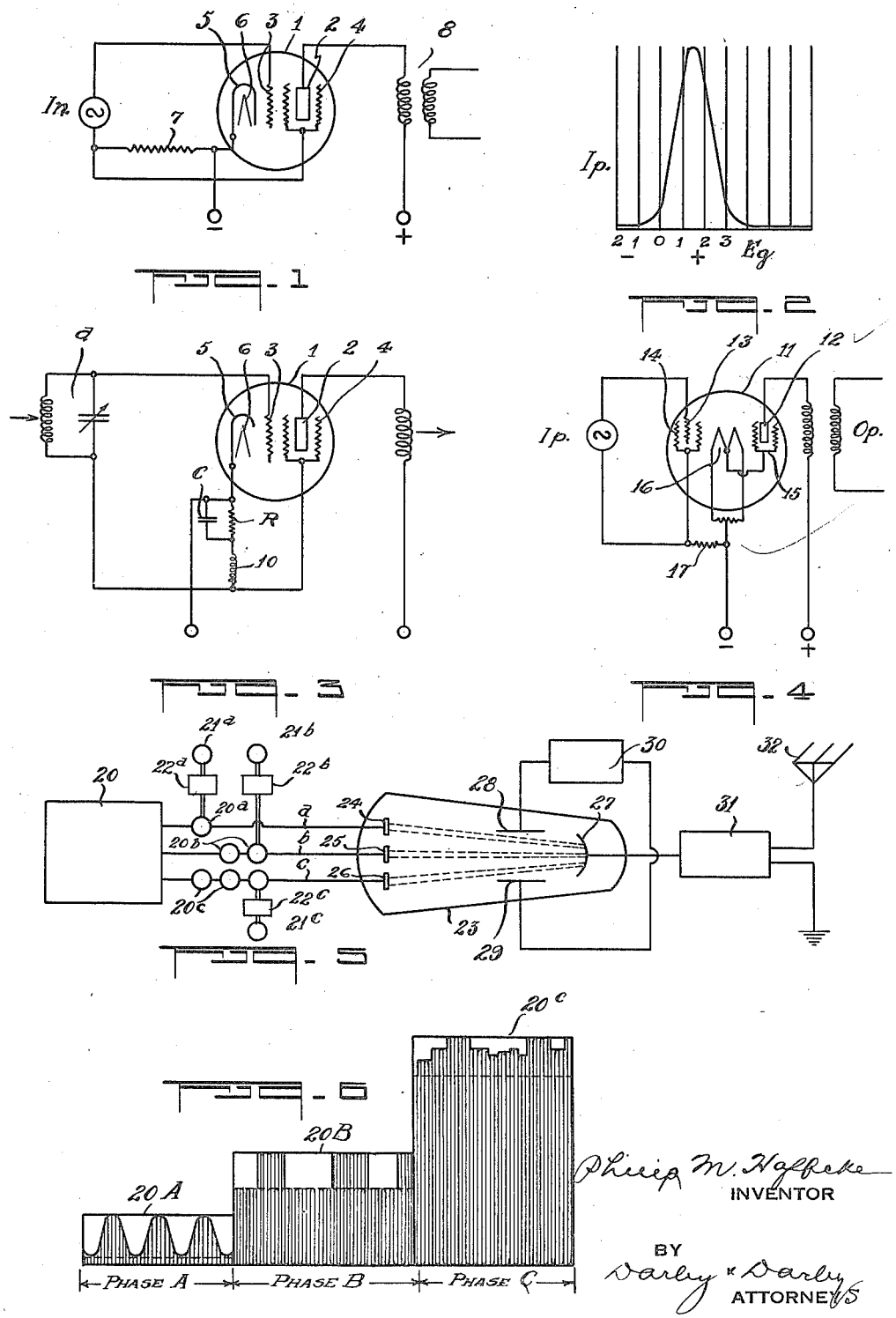

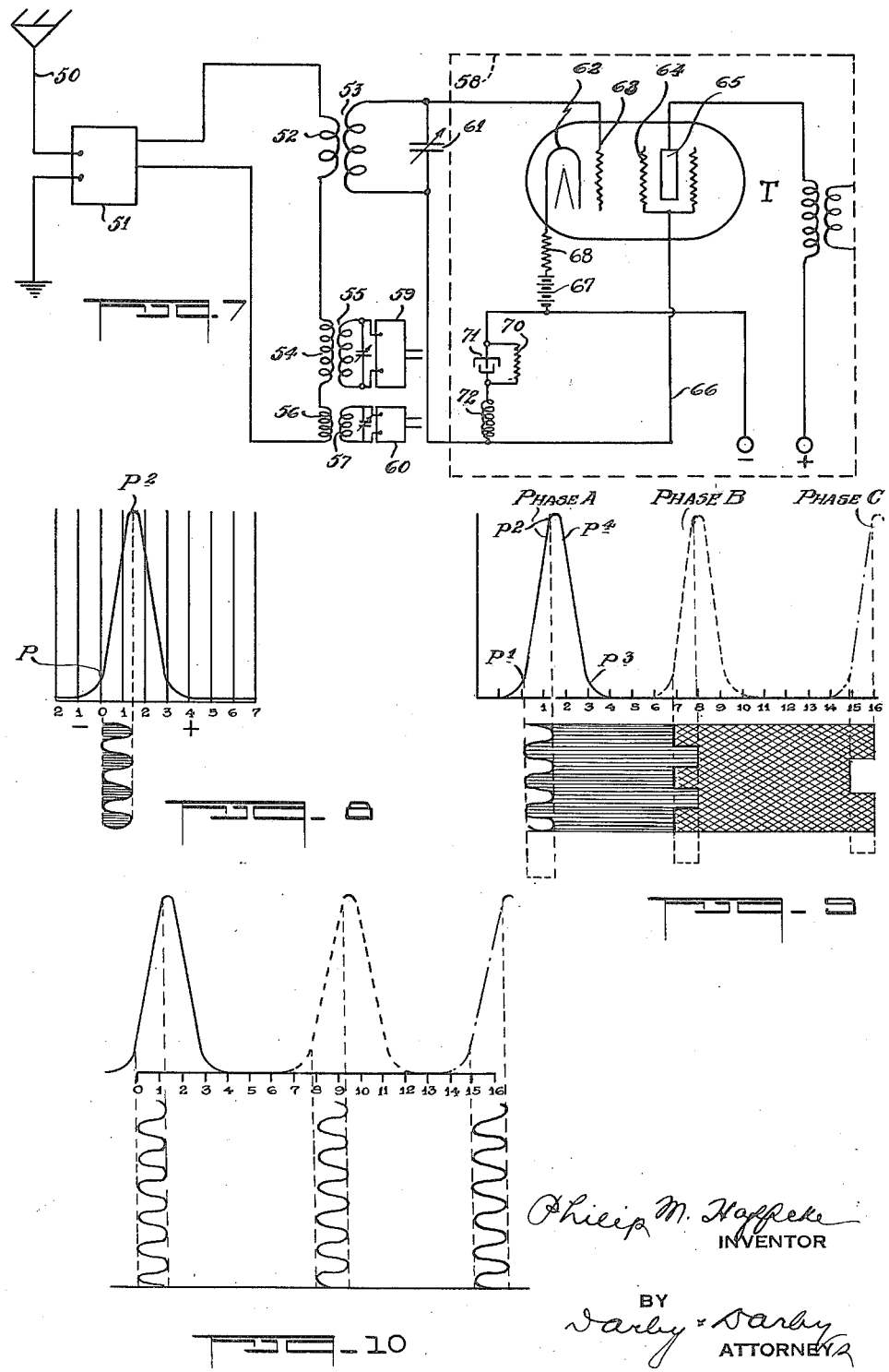

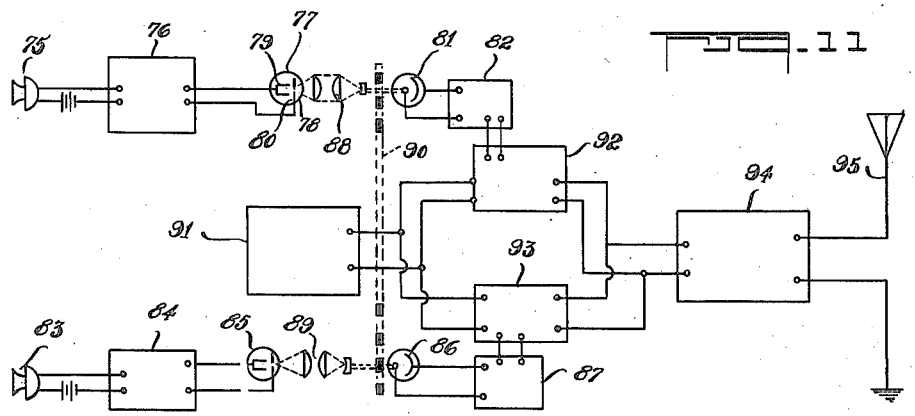
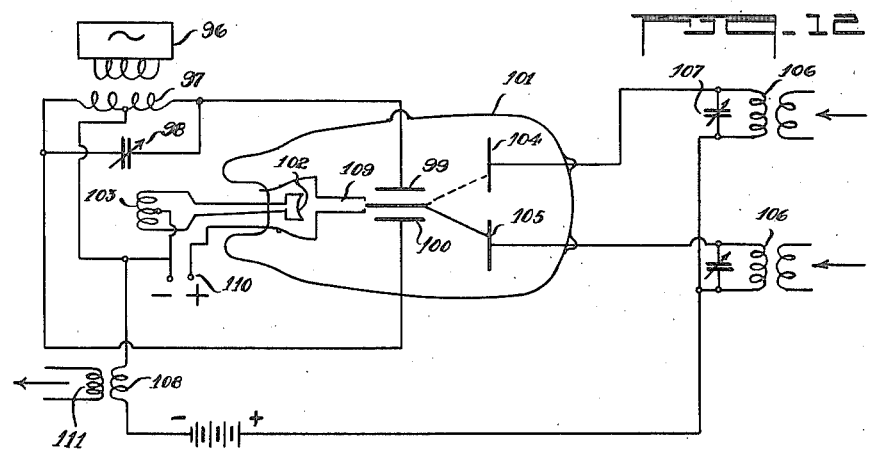
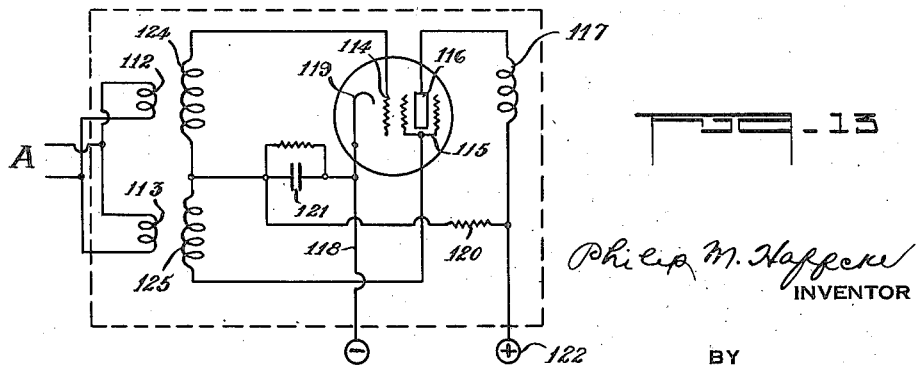

Patented Oct. 27, 1936

2,058,686

UNITED STATES PATENT OFFICE 2,058,686

WAVE SIGNALING METHOD AND APPARATUS

Philip M. Haffcke, Yonkers, N. Y., assignor to Radio Research Laboratories, Inc., New York, N. Y., a corporation of Delaware Application October 25, 1932, Serial No. 639,442
Renewed April 14, 1936

14 Claims. (Cl. 179—171)

This invention relates to wave signaling systems, and with particularity to systems for transmitting a plurality of signals at a single carrier frequency.

A principal object of the invention is to provide an electric discharge device and circuit arrangements therefor whereby the device is capable of fulfilling its usual wave repeating and/or amplifying functions when the impressed voltage is within predetermined limits. It is also capable of automatically operating as an "on-off" valve when the impressed voltages are outside said limits.

Another object of the invention is to provide an electric discharge tube with circuit arrangements whereby the $E_g$—$I_o$ output characteristic is substantially wave shaped, that is it has a rising and falling characteristic over a certain range of grid voltages.

Another principal object of the invention is to provide a system of repeating and reproducing signal waves with a minimum of disturbance from extraneous or parasitic sources such as static whether artificial or natural.

Another object is to provide an electric discharge device and circuit arrangements therefor which is capable of use in modulated carrier current systems, and wherein the percentage of modulation in the carrier is utilized to control the operation of the device either as an on-off valve, or as a wave repeater.

Another object of the invention is to provide a method of signaling employing a single carrier frequency which is modulated at different percentages for different signals in conjunction with a receiving arrangement whereby the separate signals are automatically diverted into corresponding channels without employing any moving parts, and without employing differently responsive frequency filters.

Another object of the invention is to provide a method of signaling at a single carrier frequency by modulating a carrier at different percentages of modulation for different signals in conjunction with means for employing the different percentages of modulation to divert the separate signals into corresponding receiving channels.

A feature of the invention relates to an electron discharge device which is arranged to have its plate current or output current varied only in response to grid voltage of a definite limited range.

Other features and advantages not specifically enumerated will be apparent after a consideration of the following detail descriptions and the appended claims.

While the invention will be described hereinafter as applied to certain specific types of signaling systems, utilizing known types of "plural-grid" tubes, it will be understood that the invention is not limited in this respect since the invention is applicable to systems employing any of several known types of tubes whether of the vacuum or gas filled types. As is well known in the vacuum tube art, the grid-voltage plate-current characteristic curve of the usual vacuum tube shows a gradual rise from the lower cut-off or bottom end of the curve, then a substantially linearly rising section (the usual working range), which gradually levels off at the saturation point. Since ordinary amplifier tubes are worked on the linear part of the curve, an excessive impulse on the grid will invariably cause the plate current to exceed its designed operating value. As soon as the plate current approaches the saturation point there is considerable distortion produced. With ordinary vacuum tubes there is a fairly well defined plate current "cut-off" at the lower end of the curve, while the bend at the upper end is as a rule not so sharp, therefore the overall amplification of the tube falls off less rapidly at the upper end. Under these conditions, therefore sudden impulses of energy such as static or other parasitic surges produce corresponding values of increased plate current which are reproduced in the output device.

In accordance with the present invention the repeater or amplifier tube is provided with circuit arrangements whereby a second and well defined plate current cut-off is produced as the grid voltage exceeds a predetermined critical value. This condition may be represented by an inverted V or wave shaped $E_g$—$I_p$ characteristic.

Certain objects and advantages will be apparent and the invention will be more readily understood by reference to the following specification and the accompanying drawings, wherein—

Fig. 1 schematically shows a feature of the invention in its simplest form;

Fig. 2 shows the $E_g$—$I_p$ characteristic of the system of Fig. 1;

Fig. 3 shows features of the invention applied to a standard plural grid tube such as a so called screen grid tube;

Fig. 4 shows the invention as applied to a five-element tube such as a pentode;

Fig. 5 illustrates schematically one manner of dividing a carrier frequency wave into useful sections of, super-audible frequency and of different amplitude;

Fig. 6 shows a typical train of modulated waves produced by the system of Fig. 5;

Fig. 7 shows schematically a selective circuit utilizing percentage-modulation discrimination for the purpose of diverting different signals into respective channels;

Figs. 8, 9 and 10 are diagrammatic curves for explaining the system illustrated in Figs. 5 and 7;

Fig. 11 is a schematic diagram of another form a transmitter that may be used in accordance with the invention;

Fig. 12 is a detailed electric diagram of a cathode ray commutator that may be used with a two-channel system;

Fig. 13 shows a modified manner of controlling the normal grid bias on the selector tubes according to the invention.

Referring to Fig. 1, there is shown an electric discharge device 1 which may take the form of an evacuated vessel and suitably mounted within this vessel are an anode 2, a first grid 3, an auxiliary grid 4, and an electron emitting cathode 5. The cathode 5 may be of any well known type, and is illustrated in the drawings as of the so-called indirectly heated or uni-potential type, which is provided with a heater filament 6 that may be heated from any suitable source of current (not shown) whether direct or alternating. The operating anode potential and current supply for the device is provided from any suitable source designated in the drawings simply by positive and negative symbols. For purposes of explanation, the input to the tubes is represented by the legend $I_n$, which may represent any source of fluctuating currents such as a signal generator, a transmitter or the like. This source $I_n$ is connected across the grid 3 and the auxiliary grid 4. A resistance or impedance 7 is connected between the cathode 5 and the auxiliary grid 4. The resistance 7 may be of any suitable value, preferably between 500 ohms and 500 megohms, depending to some extent upon the type and characteristics of the tube 1. If the input is a radio frequency current, the resistance 7 may be replaced with a radio frequency choke coil. In other words, the member 7 is designed to have a resistance to the flow of direct current if the input is of direct current voltage, while the said member 7 will have an appropriate impedance to alternating current if the input is an alternating or fluctuating voltage. The varying plate currents are taken off by a suitable output transformer 8, or in any other manner well known in the radio art.

Referring to Fig. 2 there is shown a curve which represents the relation between the grid voltage and the output current of the system of Fig. 1. From this figure it will be seen that as the grid 3 varies from zero to positive and from zero to negative, the output current follows a substantially wave-shaped or inverted V characteristic. As the grid voltage swings from the negative to zero the plate current rises, probably due to the lesser opposing action of the control grid, and allowing the flow of electrons therethrough towards the plate. As the grid voltage passes into the positive range the plate current continues to increase until the critical point is reached, this point being represented at the apex of the curve in Fig. 2. From this point on any further increase in positive potential on the grid 3 results in a rapid decrease in plate current until the latter reaches a cut-off point at approximately zero. It is to be noted that the rising and falling portions of the curve of Fig. 2 are substantially symmetrical with relation to each other, and are also substantially linear. Consequently the plate current is not subjected to distortion whether the system is operating on the rising or falling part of the curve.

One possible explanation of the foregoing phenomena is that, as the grid 3 goes positive, the auxiliary grid 4 goes proportionately negative so that the electrons passing through the grid 3 approach the negatively charged grid 4 and are repelled and turned back towards the grid 3. When the negative charge on the grid 4 is of sufficient magnitude practically all of the electrons are repelled and the plate current is substantially cut off. Probably also there is an absorption of electrons by the grid 3 when the charge thereon is positive, and as a matter of fact, a certain amount of grid current may flow in the grid-cathode circuit through the resistance 7. This electron absorbing action of the positively charged grid 3 tends to lessen the number of electrons passing to the side of the grid 3 facing the auxiliary grid 4. However, it is to be understood that the invention is not limited to a system wherein actual grid currents flow between the grid 3 and the cathode 5, since it has been found that the general contour of the curve of Fig. 2 is obtained for an extremely large range of values for resistance 7. For example, values of from 1000 ohms to 1,000,000 ohms were employed without changing the general contour of the corresponding curve of Fig. 2.

From the explanation of Fig. 1 it will be seen that statically considered the grid 4 is at approximately the same potential as the cathode 5, but it will be understood that the control grid 3 may be biased to any suitable static potential with respect to the cathode 5, in any manner well known in the radio art.

The system of Fig. 3 is similar to that of Fig. 1, but is designed primarily for radio frequency work. In this embodiment the parts corresponding to those of Fig. 1 are designated by the same numerals. However, since the system of Fig. 3 is to be used for radio frequencies, there is shown a tuned input circuit $a$ which has one end connected to the control grid 3 and the other end connected to the auxiliary grid 4. The circuit $a$ is adapted to have impressed thereon a modulated A. C. wave, such for example as an ordinary radio carrier wave, although the system is not limited to any particular frequency of carrier wave. The resistance 7 of Fig. 1 is replaced by a radio frequency impedance 10. Preferably in circuit with the grid 3 and the cathode 1, there is also provided a leakage path comprising the resistance R, shunted by condenser C. The function of this combination R—C is to introduce a time delay factor in the restoration of the grid to its selected normal working potential. This potential will of course be a function of the average normal maximum amplitude of the received carrier wave. In the absence of excessive voltage surges applied to the grid 3, the condenser C, thereby biasing the grid 3 statically to a point sufficient to cut off the flow of plate current during the duration of the said excessive impulse. This combination will obtain so long as the charge on the condenser C is of sufficient magnitude to bias the grid 3 to the cut-off potential. After a predetermined time, however, the condenser discharges and the system reverts to its normal current flow condition.

By proper design of the condenser C and the resistance R, it is possible to construct radio receiving sets utilizing the circuit of Fig. 3 in the detector stage, and also to utilize this circuit if desired, in the amplifying stages, and it has been found that such sets have the desirable property of substantially eliminating the loud and disturbing blasts usually attendant upon static surges.

In the systems of Figs. 1 and 3, there is apparently no clicking or other disturbing noise when the plate current is cut off, and since static surges are usually intermittent and highly damped, it has been found that as a result of "persistence of hearing" or other psychological phenomena the silent periods which are coextensive with these brief static surges are practically unnoticeable, and in any event are far less objectionable than the noise that would otherwise be present in the output. It will be understood, of course, that the systems of Figs. 1 and 3 may be utilized in connection with any other well known types of tubes.

For example, the invention is shown in Fig. 4 as applied to a standard five-element tube, such as a pentode or the like. In this embodiment the tube comprises a bulb 11, anode 12, control grid 13, suppressor grid 14, screen grid 15 and cathode 16. Similar to the showing of Fig. 1, the input in Fig. 4 is designated by the symbol $I_n$ which may take the form of a transmitter or signal generator of any known type. A resistance 17 is provided between the electrical midpoint of the filamentary cathode 16 and the grid 13, to provide the "shifting bias" under control of the received waves, for obtaining the desired plate current cut-off. It will be understood, of course, that the resistance 17 may be replaced by an impedance and condenser-resistance combination such as shown in Fig. 3. In all other respects the system of Fig. 4 operates substantially the same as that of Fig. 3, and has an inverted V or wave shaped characteristic similar to that of Fig. 2.

It will be understood of course that the systems of Figs. 1, 3 and 4 are useful not alone in high frequency signaling work, but also in circuits employing direct current signal inputs of varying or fluctuating voltages.

While the arrangements of Figs. 1 to 4 are capable of use in a variety of systems, the invention may be used to great advantage in reducing the frequency band necessary for the transmission of different signals. At the present time the most usual method of transmitting different signals is to transmit the signals on separate carriers, each having its own distinctive carrier frequency. Such systems require not only an extremely wide frequency band, but also require, at the receiving end, filter networks or the like for the purpose of diverting the signals into their respective channels. By means of the present invention it is possible to transmit two or more separate signals at a single carrier frequency without employing any rotating distributors or filter networks at the receiving station. It is entirely possible with the present invention, therefore to utilize a tube not only as a repeater, but also as a selective device, the selecting characteristics being based upon the fact that the device with its circuits is responsive to different percentages of modulation in the carrier impressed thereon. For example, a carrier wave of constant frequency may be divided into super-audible groups each group having a different percentage of modulation, and with the several divisions of each group in phase with corresponding divisions in succeeding groups and with the corresponding divisions having similar percentages of modulation.

There is shown schematically in Fig. 5, one manner of transmitting a plurality of separate signals in the form of a single carrier wave which is divided into super-audible sections, each section corresponding to a given signal and having a substantially constant percentage of modulation. In Fig. 5 the numeral 20 represents a source of sustained high frequency waves such as a vacuum tube oscillator or the like. The output from the oscillator 20 is divided into a plurality of channels, there being three of these channels a, b, c, illustrated in the drawings, although it will be understood that the invention is not limited to any specific number of channels. The currents in each channel are passed through associated amplifiers designated by the numerals $20^a$, $20^b$, $20^c$. It will be noted that in the channel a the currents are subjected to a single stage of amplification, while in the channel b they are subjected to an additional stage of amplification, and while in channel c they are subjected to a further additional stage of amplification. If desired, suitable phase shifting devices may be provided in each channel to insure the proper phase relation between the currents in the several channels. Alternatively instead of employing different numbers of amplification stages, single stage amplifiers may be employed in each channel but each having a different grid from the others.

In other words, the currents in the outputs of the respective channels have different maximum amplitudes, indicated schematically by the respective horizontal lines $20^A$, $20^B$ and $20^C$ of Fig. 6. Associated with the output stage of each amplifier are signal transmitters $21^a$, $21^b$, $21^c$. The output of each signal transmitter is applied through an associated modulator $22^a$, $22^b$, $22^c$, to cause the amplified oscillations to be correspondingly modulated in the usual manner.

However, preferably the modulators $22^a$, $22^b$ and $22^c$ are so designed that each produces a different percentage of modulation in the carrier current in its respective channel. For example, the modulator $22^a$ may be designed to produce a modulation of approximately 90% of the carrier in channel a, while modulator $22^b$ produces a modulation on the order of say 40% in the current in channel b, while modulator $22^c$ produces a percentage modulation of the order of 20% in the currents in channel c.

In order to divide the transmitted carrier into successive super-audible divisions, there is provided a cathode ray commutator designated by the numeral 23. This commutator may be made in accordance with well known principles of cathode ray construction, and comprises a set of three anodes 24, 25 and 26, and a common cooperating electron emitting cathode 27, by means of which cathode rays or electrons may be emitted in a substantially straight line towards the anodes 24, 25 and 26. Also positioned within the tube 23 is a pair of deflecting plates 28 and 29. The plates 28 and 29 are connected to a suitable source of high frequency oscillations 30, by means of which the cathode ray beam is continuously oscillated back and forth across the anodes 24, 25 and 26. Preferably, however, the anodes 24, 25 and 26 are arranged in a circle and the tube 23 is provided with another set of deflecting plates at right angles to plates 28 and 29. These other plates have impressed thereon an alternating potential which is so related to the potential on plates 28 and 29 in phase and frequency that the cathode beam is given a circular deflection, thus covering the anodes in regular cyclical order.

While the drawings are schematic so far as the cathode ray tube structure and deflecting means are concerned, it will be understood that any well known cathode ray deflector means may be employed. Preferably, also the cathode ray beam is oscillated at a super-audible frequency so that the output which is fed to the power amplifier 31 consists of a single frequency wave cyclically divided into three phases, there being one phase for each of the anodes 24, 25 and 26.

In other words when the cathode beam is deflected so as to sweep over the anode 24, there is applied to the amplifier 31 a current having a maximum amplitude determined by the amplifier 20$^a$ and a percentage modulation determined by the modulator 22$^a$. When the cathode beam moves so as to sweep the anode 25, there is applied to the amplifier 31 a modulated current having an amplitude determined by the amplifier 20$^b$ and a percentage modulation determined by the modulator 22$^b$. Similarly when the cathode beam sweeps over the anode 26 there is impressed upon the amplifier 31 a carrier current having an amplitude determined by the amplifier 20$^c$, and a percentage modulation determined by the modulator 22$^c$. If desired the output of the amplifier may be transmitted directly by means of a wire or radiated into space by means of a suitable radiating network such as the antenna 32.

There is shown in Fig. 6 a typical form of wave as applied to the amplifier 31, and as radiated from the antenna 32. In this figure the current is shown as divided into three separate phases. The phase A corresponds to the current which flows from the anode 24 to the cathode 27; phase B represents the current which flows from the anode 25 to the cathode 27; and phase C represents the current that flows from the anode 26 to the cathode 27. In other words, Fig. 6 represents the currents corresponding to one-half cycle of oscillation of the cathode ray beam so that when the beam retraces its path there are produced phases (not shown) corresponding respectively to the phases A, B and C.

As will be apparent from Fig. 6, the waves in phase A are modulated to a greater percentage than are the waves in phase B, or phase C. As above mentioned, by way of example, the currents in phase A may be subjected to an 80% modulation, whereas the currents in phase B may be subjected to a 40% modulation and the currents in phase C subjected to 20% modulation. It will thus be seen that there is transmitted from the antenna 32 a single frequency carrier wave which can be considered as divided into super-audible sections or phases, each section having a different maximum amplitude and each section having a different percentage modulation from the remaining sections.

It will be understood, of course, that the cathode ray commutator of Fig. 5 is merely chosen as illustrative and that any other well known type of high frequency commutator may be employed, as will be described herein in connection with Fig. 11.

In order to divert the several phases of the single frequency carrier into their respective receiving channels, a device such as illustrated in Figs. 1, 3 or 4 of the drawings may be employed. For example, as shown in Fig. 7, the carrier wave may be intercepted by a suitable antenna 50 and amplified by a suitable amplifier 51. The output of the amplifier 51 is fed through the primary windings 52, 54 and 56 of a series of transformers 53, 55, 57. While the drawings show these transformer primaries connected in series to the output of the amplifier, it will be understood that any other suitable arrangement of connection may be employed. Inasmuch as the currents in the respective transformers are of the same frequency, namely the carrier frequency, these transformers are provided with tuning condensers such as the condenser 61 for tuning the coils to the carrier frequency. In other words, the current in each of the transformers is at the same frequency. The output from each tuned circuit is applied to a selecting unit, one of these units being shown in comparative detail in Fig. 7, and designated by the numeral 58. It will be understood, of course that corresponding units, indicated schematically by the numerals 59 and 60 are associated with the respective tuned circuits 55 and 57. The unit 58 comprises a vacuum tube having an electron emitting cathode 62, a control grid 63, an auxiliary grid 64 and an anode 65. This tube may be of any well known type, for example a so called shield grid or screen grid tube, the screen grid being represented by the numeral 64 in the drawings. A suitable source of anode operating potential is indicated by the positive and negative terminals in the drawings.

It will also be understood that while the drawings show a cathode 62 of the so-called indirectly heated type, any other well known form of electron emitting cathode may be employed. The tuned circuit 53 has one terminal connected to the grid 63 and the other terminal connected by wire 66 to the auxiliary grid 64. For the purpose of controlling the normal static bias to the grids 63 and 64, with relation to the cathode 62, there is provided a battery 67 which is connected in series with resistance 68 between the cathode 62 and the negative terminal of the power supply.

For the purpose of adjusting the "drifting bias" which is derived partly as a function of the percentage modulation in the received carrier and the voltage amplitude of the rectified component of the carrier wave in the output of tube T, there is provided in addition resistance 70 shunted by a condenser 71 in series with a radio frequency impedance 72. If desired the impedance 72 may be omitted and a return connection made to a point in the secondary of the transformer 53. As described above the condenser 71 is charged to an extent determined by the rectified component of the carrier of the waves applied to the transformer 53 and the percentage modulation, and the resistance 70 is provided to facilitate the rapid discharge of the condenser upon the reduction of the charge to the cut-off point, at which the selecting unit is to function.

In other words, each of the channels can be designed and adjusted so that the resistance-condenser combination 70—71 cuts off the plate current at a different point for each of the channels. It will be understood, of course, that the tube T may function as a detector, or as a straight audio or radio frequency amplifier. In either case the rectifying action between the members 62 and 63 serves to charge the condenser 71 under control of the impressed waves. Thus each channel will have its tube T biased under control of the received waves to a different amount.

As hereinabove pointed out in connection with Fig. 2, the shape of the characteristic curve of the tubes T in the several channels remains substantially the same, the only difference being that the bias for these channels shifts the curve along the horizontal axis.

As explained in connection with Figs. 8, 9 and 10, these several figures represent curves of grid-voltage plate-current in the respective channels. For example, Fig. 8 represents the $E_g$—$I_p$ characteristic of the first channel shown in detail in Fig. 7, wherein the normal bias point is approximately zero and the percentage of modulation being approximately 100%. Under these conditions the tube T works on the linear portion of the characteristic curve between the points $P_1$—$P_2$. Consequently the amplification in this channel will be similar to that of the usual discharge tube. Or to put the matter another way, so long as the average amplitude and percentage of modulation of the impressed signals are sufficient to produce only a drifting bias of approximately zero volts, the current will pass only through the first channel. The tube of this first channel will not respond to signals of the amplitude and percentage modulation of either phase B or phase C because the modulated section of the carrier in these phases is beyond the cut-off point, for example, 3 volts, as shown in Fig. 9. Similarly the second channel corresponding to phase B will pass only signals of the amplitude and percentage modulations corresponding to phase B and there will be a bias of approximately 8 volts on the control grid of the tube T in this second channel. In other words the tube T in the second channel will only pass current in the plate circuit when the grid bias varies between say approximately 6 and 10 volts. Similarly the unit 60 may be adjusted so that the normal grid bias corresponding to the average amplitude and percentage modulation of phase C causes the tube in this channel to operate as indicated by the curve labeled phase C (Fig. 9).

Preferably the various channels are so adjusted that the tube therein normally works, so far as signal modulations are concerned, only on the rising linear portion of the wave shaped curve, although if desired the channels may be designed to work only on the falling portion of the characteristic curve.

Assuming for example that the channel 53 is so adjusted that the tube T works on the portion $P_1$—$P_2$ of the characteristic curve, then when a sudden surge of static or other disturbing voltage is applied sufficient to carry the plate current over the bend of the curve to the falling portion thereof, there are produced double frequency components. However, these double frequencies may be eliminated in any suitable manner by filters or balancing networks. In any event, the fact that the curve has a double cut-off limits the response of the disturbing impulses to a comparatively narrow range. For example, the tube T is adjusted so that it has two cut-off points, at approximately zero volts, and at approximately 4 volts, so that any sudden surges above 4 volts are not repeated into the output circuit. It will be obvious, of course, that the channel may be adjusted to work normally between the points $P_3$ and $P_4$ instead of between the points $P_1$ and $P_2$.

It will be understood that the output signal of each channel may be provided with a suitable signal responsive device. For example, each channel may be designed to carry a separate message if desired, in which case each channel will be equipped on the output side with a suitable signal responsive device, such as a sound reproducer or the like. It will likewise be apparent that certain of the channels may be used for control purposes. For example, phase A may represent voice signals, phase B may represent television or image signals, and phase C may represent synchronizing signals, in which event in the output circuit of the first channel (Fig. 7) there will be provided a suitable sound reproducing device, while in the output of the channel 59 there will be provided a suitable television reproducing unit to be operated by the currents in this channel, while the output of channel 60 will be applied to a suitable synchronizing device for synchronizing the transmitting televisor with the receiving televisor.

Referring to Fig. 10 there is shown in schematic form another type of transmitter that may be used in conjunction with a receiver similar to that of Fig. 7. The transmitter of Fig. 10 is shown, merely for the purpose of securing simplicity, as of the two channel type. For example, the first channel is provided with a microphone or other suitable signal generator 75, the output of which is amplified in a suitable amplifier 76. The output of amplifier 76 may be applied to a lamp 77 which is adapted to have its brilliancy varied in accordance with the variations in output from the amplifier.

While any well known form of lamp may be employed for this purpose, it is preferred to employ a gaseous discharge lamp such as ordinarily used in television or sound recording systems or the like. For example, this lamp may comprise an envelope 78 having a filling of neon or neon and argon, and having suitably mounted on the interior thereof a crater shaped electrode 79 and a perforated disc electrode 80. Positioned in alignment with the opening in the disc 80 is a light responsive cell 81 of known type, the output of which is amplified by a suitable amplifier 82. Similarly, in the second channel there is provided a microphone or signal transmitter 83, an associated amplifier 84, a gaseous discharge lamp 85, a photoelectric cell 86, and an amplifier 87. If desired, suitable optical systems 88, 89 may be provided for properly projecting the light from the lamps onto the respective photoelectric cells. In order to render the channels successively and cyclically effective, there is provided a rotating toothed member 90. This member may take the form of an ordinary gear wheel of suitable size and having a suitable spacing between the teeth. For example this wheel may be a gear having 192 teeth, the wheel being 4″ in diameter and the spacing between the teeth being of the order of 0.03″, and the light beam being approximately 0.002″ in width. Gear wheels of this type are made commercially and are very well suited for the present purpose.

As shown in the drawings, the wheel or light interrupter 90 is so positioned with respect to the beams from the lamps 77 and 85 that at any given instant an open space is presented to the light 80, whilst an opaque tooth is simultaneously presented to the light 85. Consequently, as the member 90 rotates the cells 81 and 86 are alternately and successively energized under control of the respective signal generators 75 and 83. If desired, a specially designed wheel may be employed wherein the light from the lamps is interrupted in a sinusoidal manner, although this is not absolutely necessary.

As above pointed out, the member 90 is rotated at a sufficiently high speed to interrupt the light at super-audible frequencies. For example, the wheel 90 above described, may be rotated at the rate of 10,000 R. P. M. Associated with each of the two channels is a master oscillator or any other well known type of oscillator. The output of the oscillator is applied to a pair of modulators 92 and 93, preferably of the vacuum tube type, as ordinarily employed in the radio transmission art. The output of amplifier 82 is applied to the modulator so that there is produced in the output of device 92 a wave having a frequency and wave shape of the master oscillator, modulated in accordance with the signals from device 75. Similarly, the output of amplifier 87 is fed into a common power amplifier 94, the output of which is transmitted by a suitable transmission system such as the antenna 95.

As above pointed out, in order that the transmitter may work properly with a receiver of the type shown in Fig. 7, it is necessary that the waves in each channel be modulated to a different percentage. For example, the modulator 92 may be so adjusted that there is effected a modulation of approximately 100% in the carrier applied to this modulator, while the modulator 93 may be adjusted to effect a 10% modulation in the waves applied thereto. Consequently the output of the amplifier 94 consists of a carrier wave of uniform frequency corresponding to that of the oscillator 91, which has alternate super-audible sections or portions modulated to different percentages.

As above pointed out in connection with Fig. 5, the amplifiers 82 and 87 are designed to have different gains, so that the carrier currents corresponding to the first channel will have a maximum amplitude which is different from that of the currents in channel 2, and likewise preferably this maximum amplitude is less than the minimum modulations in the second channel. In other words, the output of the amplifier 94 will correspond to a wave similar to that represented by phase A, and phase B of Fig. 6.

Referring to Fig. 12 there is shown in detail a typical form of electrical circuit that may be used with a cathode ray commutator for a two channel system. In this figure the numeral 96 represents an oscillator of super-audible frequencies such as a vacuum tube oscillator or the like. The output of this oscillator is applied through a tuned circuit comprising the coil 97 of the variable condenser 98 across the deflecting plates 99 and 100 of a cathode ray tube 101. This tube comprises an electron emitting cathode 102 such as a coated filament or the like which is heated from a suitable source of current such as the secondary 103 of a transformer. Each of the units 104, 105 has connected in series with it a secondary winding 106 of an input transformer which may be tuned by a variable condenser 107. Each of the windings 106 is connected to the positive terminal of a suitable source of anode potential, the negative terminal of which is connected in series with the primary winding 108 of an output transformer, the other terminal of this winding being connected to the midpoint of the filament transformer 103. Positioned between the cathode 102 and the deflecting plates 99, 100 is a ray focusing device 109 of known construction, such as a metallic tube or the like, this member being connected to a positive terminal 110 of a suitable source of direct current. The primary of each of the transformers 106 is connected to the output of an associated oscillator-modulator similar to the arrangement of Fig. 5, it being understood that the oscillations are modulated independently of each other by respective signal transmitters and the carrier in one channel is amplified and modulated to a greater percentage than in the other channel as described in connection with Fig. 5.

The output of the system of Fig. 12 is taken off the secondary 111, and therefore consists of a single frequency carrier which is divided into alternate and successive phases by means of the cathode ray commutator, one phase having an average maximum amplitude which is considerably lower than that of the other phase, and with the modulations thereof effected to a greater percentage than that of the other phase.

Referring to Fig. 13 there is shown a modified manner of controlling the normal bias on the selector tube. In this embodiment the input from the channel a is impressed upon two primary windings 112, 113 in parallel. The secondary of this input transformer has one terminal connected to the control grid 114 of the selector tube T, while the other terminal is connected to the grid 115. The plate 116 is connected to the output coupling coil 117 to the positive terminal of the anode supply. The negative terminal of this supply may be connected directly by wire 118 to the cathode 119. For the purpose of controlling the normal bias on the grid 114, there is provided a resistance 120 which is connected in series with the condenser 121 between the positive terminal 122 and the cathode 119. A resistance 123, similar to the resistance 70 (Fig. 7) is provided. The resistances 120 and 123 are therefore connected across the positive and negative terminals of the supply and act as a voltage divider, and the connections shown tend to maintain the grid 114 positive by a predetermined amount with respect to the cathode, this amount being controlled by the values of the resistances 120 and 123.

On the other hand, the connections are such that the impressed modulated carrier charges the condenser 121 in such a direction as to oppose the bias due to the resistances 120 and 123, so that the two together produce a resultant normal static bias on the grid 114 of the predetermined amount necessary to cause the device to have the double cut-off characteristic represented in Fig. 2. Because of the parallel connection of the primaries 112, 113 and the serial connection of the associated secondaries 124, 125, an increased resistance is given as compared with the system of Fig. 7.

While specific apparatus and circuits are disclosed herein, it will be understood that the invention is not limited thereto, and that various changes and modifications may be made without departing from the spirit and scope of the invention.

Furthermore, it will be understood that the selective feature according to the invention is not limited to any particular use. For example, while the invention has been specifically described for the purpose of transmitting different signals through the different channels, the invention may be used in any situation where a main signal is to be transmitted over one channel and a control signal over the other. For example, one channel may be utilized to transmit the voice of a singer or the like, and the other channel may be used to transmit the accompanying music such as an orchestra or the like, as a result of which the reproduction of the orchestra music may be varied to any extent in volume without affecting the volume or clarity of the accompanying vocal reproduction and vice versa.

Similarly the channels may be used for the purpose of secret communication. For example, one channel may transmit a non-modulated carrier or an irregularly modulated carrier such as a howl or the like, while the other channel transmits the signal modulated carrier. Such type of transmission would not produce any recognizable messages with the ordinary receiver, but with the receiving system disclosed it is possible to separate out the signal modulated portions of the carrier from the irregularly modulated portions.

Other ways and applications of the invention will be apparent to those familiar with the art.

What is claimed is:

1. The method of amplification employing an electric discharge tube having a cathode, a control grid and an auxiliary grid and a condenser connected between said cathode and auxiliary grid, which comprises applying the signals across the control grid and auxiliary grid, charging said condenser under control of the average amplitude of the signals, and applying said charge to said control grid to cause said tube to have a double cutoff grid-voltage plate-current characteristic.

2. The method of amplification employing an electric discharge tube having a cathode, a control grid and an auxiliary grid and an impedance connected across said cathode and auxiliary grid which comprises applying the signals across the control grid and auxiliary grid, and utilizing a portion of the signals to derive a drifting bias for said control grid, whereby said tube has a double cutoff grid-voltage plate-current characteristic.

3. The method of amplification employing an electric discharge tube, having a cathode, a control grid and an auxiliary grid and an impedance connected across said cathode and auxiliary grid, which comprises applying the signals across said control grid and auxiliary grid, and biasing said control grid under control of the applied signals to cause said tube to have a double grid-voltage plate-current cutoff characteristic.

4. The method according to claim 3, in which said bias is such as to cause said tube to have an inverted V characteristic.

5. An amplifying system comprising an electron discharge tube having a cathode, a control grid and an auxiliary grid, means for impressing signals across said control grid and said auxiliary grid, and electro-static storing means connected between said cathode and auxiliary grid for producing a drifting bias on the control grid under control of the impressed signals, whereby said system has a double cutoff grid-voltage plate-current characteristic.

6. A wave repeating system comprising an electric discharge tube having a cathode, a control grid and an auxiliary grid, means for impressing signals to be repeated on said control grid and said auxiliary grid, and means for biasing the control grid to cause the system to have a double grid-voltage plate-current cutoff characteristic, the last mentioned means including a condenser connected to the cathode.

7. A wave repeating system comprising an electric discharge tube having an electron emitting cathode, a control grid and an auxiliary grid, an input device having one terminal connected to the control grid and the other terminal connected through a resistance to the cathode and connected directly to said auxiliary electrode.

8. A wave repeating system comprising an electron discharge device having a cathode, a control grid and an auxiliary grid, an input circuit having one terminal connected to the control grid and the other terminal connected through a high frequency choke, and a condenser to the cathode, said other terminal also being connected to the auxiliary electrode.

9. A wave repeating system according to claim 8, in which the said condenser is shunted with a resistance.

10. A wave repeating system comprising an electron discharge device having a cathode, a control grid and an auxiliary grid, a connection between the cathode and the auxiliary grid including in series a condenser and a high frequency choke coil and an input circuit having one terminal connected to the control grid and the other terminal connected to the auxiliary grid.

11. A wave repeating system comprising an electron discharge device having a cathode, a control grid, and an auxiliary grid, an input circuit connected across said grids, a steady source of potential for applying a steady bias to said control grid, and means for applying a drifting bias to said control grid including a condenser connected between said cathode and one terminal of the input circuit.

12. A system according to claim 11, in which the said condenser is shunted by a resistance and has in series therewith a high frequency choke coil.

13. In a wave receiving system the combination of an electron discharge device having a cathode, a control grid and an auxiliary grid, means for applying received modulated waves across said grids, means for storing a portion of the impressed waves to provide said grid with a drifting bias determined by the amplitude and percentage modulation in said waves, and means for adjusting the bias on said control grid to provide said device with a double-cutoff grid-voltage plate-current characteristic.

14. A wave receiving system comprising an electron discharge device having a cathode, a control grid and an auxiliary grid, means for impressing received modulated waves across said control grid and said auxiliary grid, and means for biasing said control grid under control of the received waves to cause said device to have a double-cutoff grid-voltage plate-current characteristic.

PHILIP M. HAFFCKE.